C. C. BLANCH.
BRAKE MECHANISM.
APPLICATION FILED AUG. 13, 1914.
1,170,216.
Patented Feb. 1, 1916.
2 SHEETS—SHEET 1.
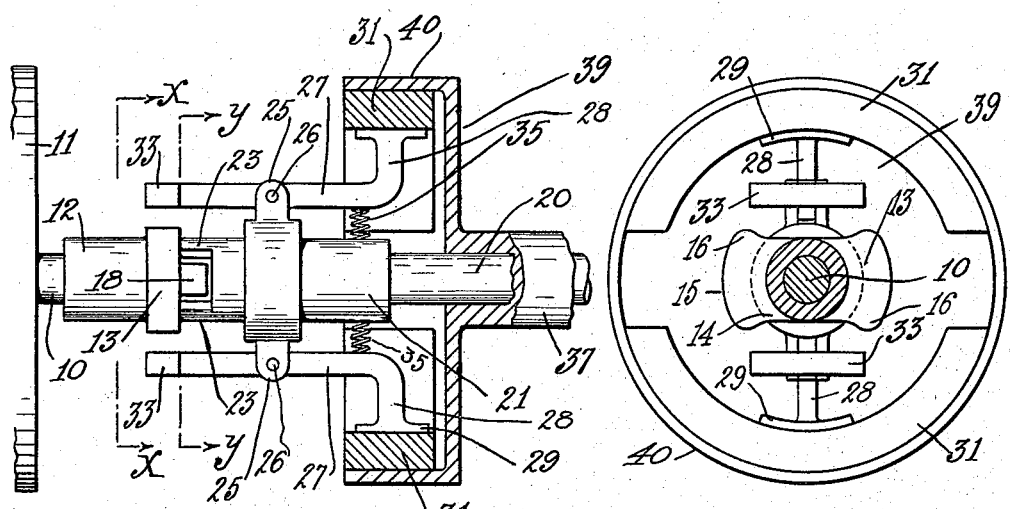
Fig. 1.
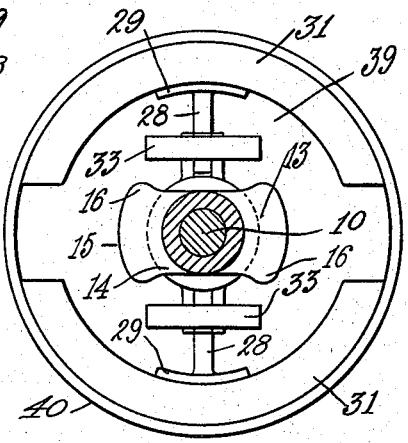
Fig. 2.
Fig. 3.
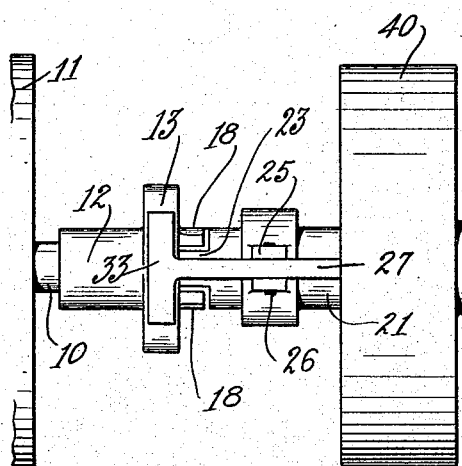
Fig. 4.
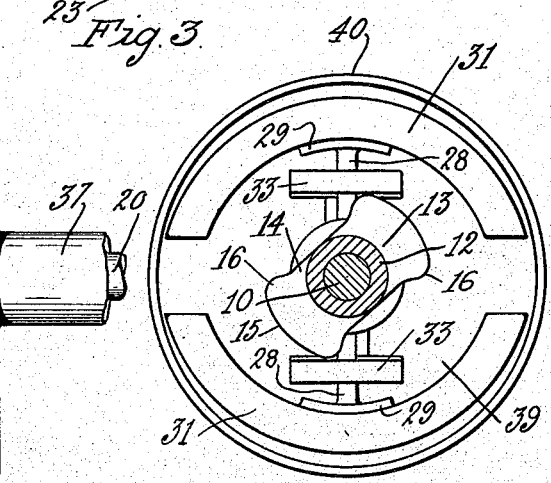
Fig. 5.
Fig. 6.
Witnesses.
Albert G. Pieczynkowski.
Freda C. Anderson.
Inventor
Charles C. Blanch
By Horatio E. Bellows
Attorney.
THE COLUMBIA PLANOGRAPH CO., WASHINGTON, D. C.

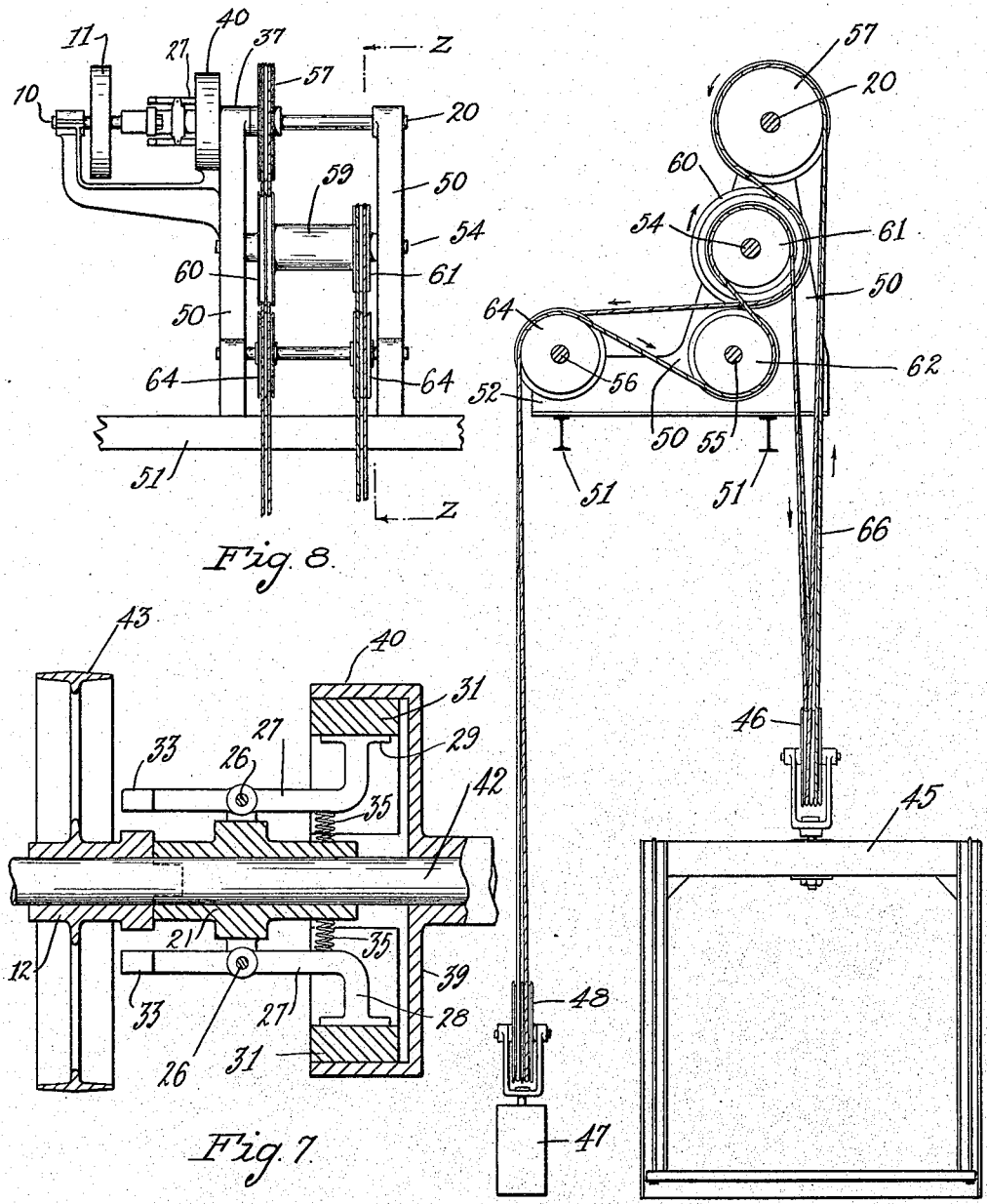

UNITED STATES PATENT OFFICE.

CHARLES C. BLANCH, OF PROVIDENCE, RHODE ISLAND.

BRAKE MECHANISM.

1,170,216.  Specification of Letters Patent.  Patented Feb. 1, 1916.

Application filed August 13, 1914. Serial No. 856,682.

*To all whom it may concern:*

Be it known that I, CHARLES C. BLANCH, a citizen of the United States, residing at Providence, in the county of Providence and State of Rhode Island, have invented certain new and useful Improvements in Brake Mechanisms, of which the following is a specification.

My invention relates to brakes adapted for use in hoisting and other mechanisms.

The essential objects of my invention are certainty, facility, and economy in operation, combined with strength, simplicity, and inexpensiveness.

My invention consists primarily in rendering it possible to automatically apply the brake by merely checking the rotation of the driving shaft; and in such parts and combination of parts as fall within the scope of the appended claims.

In the accompanying drawings which form a part of this specification; Figure 1, is a side view, partly in section, of my novel brake mechanism, Figs. 2 and 3, sections of the same on lines $x$ $x$ and $y$ $y$ respectively of Fig. 1, Fig. 4, a plan of the same, Figs. 5 and 6, sections respectively on lines $x$ $x$ and $y$ $y$ of Fig. 1 showing the parts in open position. Fig. 7, a longitudinal section of a modified form of my invention, Fig. 8, a side elevation of my brake mechanism incorporated in an elevating apparatus, and Fig. 9, a section on line $z$ $z$ of Fig. 8.

Like reference characters indicate like parts throughout the views.

In the drawings 10 is a power or driving shaft, driven by a pulley 11 fast thereon, from any convenient source of power. Fixed to the shaft is a sleeve 12 provided with a cam 13. In the present instance the cam comprises an oblong body 14 provided with arcuate end faces 15 terminating in rounded lateral shoulders 16. Integral with the front face of the cam are two projecting lugs 18 diametrically opposite each other adjacent the shaft adapted to serve as clutch elements for one of the two clutch members.

A driven shaft 20 in alinement with the shaft 10 is the load sustaining shaft. Fixed to this shaft is a sleeve 21 having longitudinal end lugs 23 diametrically opposite each other and located intermediate the lugs 18. On opposite sides of sleeve 21 are pairs of ears 25 in which are mounted on pins 26 intermediate their length arms 27 having outwardly extending end portions 28 terminating in plates 29 to which are fixed arcuate shoes 31. Upon the opposite ends of the arms 27 are cross pieces or laterally projecting members 33 parallel with each other at opposite sides of the cam 13, and so disposed as to be in the path of the portions 16 of the cam when the cam is rotated. Intermediate the sleeve 21 and the arms 27 are springs 35 whose ends bear against the sleeve and the inner edges of the arms respectively.

37 is a bearing constituting a part of whatever frame supports my device. Integral with the bearing is a housing comprising a disk 39 and an outwardly directed peripheral flange 40. The shoes 31 are adapted to be pressed into contact with the flange 40 by the springs 35.

My mechanism has been described as embodied in two shafts, but operative results are attained by the construction shown in Fig. 7, wherein a single shaft 42 is substituted for the shafts 10 and 20. In this case, however, the sleeve 12 is loose on the shaft, and the driving pulley 43 fixed to or integral with the sleeve 12 is substituted for the pulley 11.

The operation of my brake mechanism is herein shown in connection with a differential traction elevator mechanism comprising a car 45, traveling pulley 46 therefor, counter weight 47, and its traveling pulley 48. Standards 50 on I beams 51 are provided with rearward extensions 52. Journaled in the standards in vertical sequence are the shafts 20, 54, and 55, and in the extension, is journaled a shaft, 56. Upon the shaft 20 is fixed a sheave 57. Fast on the shaft 54 is a drum 59, comprising the differential larger and smaller sheaves 60 and 61. On the shaft 55 is a sheave, and upon the shaft 56, the sheaves 64. An endless hoisting rope 66 has in a bight the pulley 46, whence it passes over the sheave 57, under the sheave 60 over one sheave 64, then forms a bight to receive the pulley 48, and thence passes over the other sheave 64 under the pulley idler 62 and over the sheave 61. Because of the differential character of the sheaves 60 and 61, the car moves upwardly or downwardly.

The operation of the brake mechanism is as follows: Power is applied through the pulley 11 to the shaft 10 which, when at rest, locates the clutch lugs 18 and 23 relatively as shown in Fig. 3. When the power has become effective the driving lugs 18 advance and occupy the position shown in Fig. 6 in contact with the driven lugs 23, meanwhile the cam 13 has rotated to such an extent that its greater dimensions have brought it in contact with the members 33, whereby the shoes 31 become disengaged from the housing, and the shafts 10 and 20 rotate together thus elevating the car 45 or permitting it to descend.

If it is desired to apply the brake during the ascent or descent of the car the operator by any convenient or well known electrical or other connection operable from the car, stops the rotation of the shaft 10 which brings the cam 13 into position out of contact with the members 33, and then the springs 35 force the shoes 31 into contact with the housing thereby checking the car or load. It will be noted that by this construction the brake operates conformably to the weight of the load. That is to say, the load can not exceed in speed the speed of the power shaft. Under light and heavy loads the brake is equally effective and automatically applies such a degree of impediment to the load as the particular load demands, and this is true regardless of whether the load is being raised or lowered. These features obviously render adjustments unnecessary.

I claim:

1. In a brake mechanism, the combination of a shaft, and radially movable pivoted means upon the shaft extending in the direction of the length of said shaft independent of said shaft, shoes carried by said pivoted means, means engageable between the free ends of said radially movable pivoted means, and a member with which said shoes coöperate to check the rotation of the shaft.

2. In a brake mechanism, the combination of a shaft, a fixed housing, means pivotally mounted and extending parallel with the shaft and having lateral means for coöperation with said housing, a cam engageable between the free ends of said pivotally mounted means, coöperating interengaging means between said cam and the shaft, and springs acting on said pivoted means for forcing said lateral means outward.

3. In a brake mechanism, the combination with the frame, of a shaft in the frame, lugs loosely registering with each other and capable of limited axial movement independently of each other, a housing fixed to the frame adjacent the shaft, a cam on the shaft, and yielding means upon the shaft normally in contact with the cam for frictionally engaging the housing when said contact is broken.

4. In a brake mechanism, the combination with the frame, of a shaft in the frame, a cam on the shaft, lugs on the cam, lugs on the shaft in the path of the first mentioned lugs, a housing on the frame, pivotally-mounted yielding arms carried by the shaft in contact with the cam, and shoes on the arms within the housing.

5. In a brake mechanism, the combination with the frame, of a shaft in the frame, a cam on the shaft, lugs on the cam, a housing on the frame, a sleeve fast on the shaft, lugs on the sleeve in the path of the first mentioned lugs, ears on the sleeve, arms pivotally mounted intermediate their length in the ears provided with end portions in the path of the cam, springs on the sleeve in contact with the arms, and shoes on the arms within the housing.

6. In a brake mechanism, the combination with the frame, of a shaft in the frame, a cam on the shaft provided with curved faces on its opposite ends and with rounded lateral shoulders at the ends of the said faces, lugs on the cam, a housing on the frame, a sleeve on the shaft, lugs on the sleeve in the path of the first mentioned lugs, ears on the sleeve, arms pivotally mounted intermediate their length in the ears having portions adapted to contact with the cam, springs on the sleeve engaging the arms, and shoes on the arms adapted to engage the housing.

7. In a brake mechanism, the combination with the frame, of a shaft in the frame, a cam on the shaft, lugs on the cam, a housing on the frame, a sleeve fast on the shaft, lugs on the sleeve in the path of the first mentioned lugs, ears on the sleeve, arms pivotally mounted intermediate their length in the ears, said arms being provided with laterally extending end portions parallel with each other and located in the path of the cam, springs engaging the sleeve and arms, and shoes on the arms adapted to engage the housing.

8. In a brake mechanism, the combination with the frame, of a rotary shaft in the frame, a sleeve on the shaft, a cam on the sleeve, lugs on the cam, a housing fixed to the frame, a sleeve fast on the shaft, lugs on the second sleeve in the path of the first mentioned lugs, ears on the second sleeve, arms pivotally mounted intermediate their length in the ears in the path of the cam, springs on the second sleeve in contact with the arms, and shoes on the arms in the housing.

9. In a brake mechanism, a shaft, a brake engaging member fixed relatively thereto, a sleeve in which said shaft is rotatable, arms pivotally mounted on said sleeve extending parallel with the shaft and carrying shoes for contact with the brake member, and a rotatable cam on said shaft disposed between and adapted to engage the other ends of said arms.

10. In a brake mechanism, a shaft, a brake engaging member fixed relatively thereto, a sleeve in which said shaft is rotatable, arms pivotally mounted on said sleeve extending parallel with the shaft and carrying shoes for contact with the brake member, a rotatable cam on said shaft disposed between and adapted to engage the other ends of said arms, and means whereby the brake mechanism is thrown into operative position when the rotation of said cam is checked.

11. In a brake mechanism, a shaft, a brake engaging member fixed relatively thereto, a sleeve in which said shaft is rotatable, arms pivotally mounted on said sleeves and carrying shoes for contact with the brake member, a rotatable cam disposed between and adapted to engage the other ends of said arms, and springs interposed between said sleeve and arms for applying the brake when the rotation of the shaft is checked.

12. In a brake mechanism, a shaft, a brake member in which the same is mounted, a sleeve on said shaft, a driving pulley loose on said shaft and a brake mechanism interposed between said pulley and the brake member and embodying arms extended parallel with said shaft and a rotatable member engageable between said arms.

13. In a brake mechanism, a shaft, a brake member in which the same is mounted, a sleeve on said shaft, a driving pulley loose on said shaft and a brake mechanism interposed between said pulley and the brake member and embodying arms extended parallel with said shaft and pivotally mounted on said sleeve and a rotatable member engageable between said arms.

14. In a brake mechanism, a shaft, a brake member in which the same is mounted, a sleeve on said shaft, a driving pulley loose on said shaft, and brake mechanism interposed between said pulley and the brake member and pivotally mounted on said sleeve, said pulley provided with cam surfaces engageable with the pivoted members of the brake mechanism.

In testimony whereof I have affixed my signature in presence of two witnesses.

CHARLES C. BLANCH.

Witnesses:
  HORATIO E. BELLOWS,
  FIELD C. ANDERSON.

Copies of this patent may be obtained for five cents each, by addressing the "Commissioner of Patents, Washington, D. C."